Oct. 19, 1971 SAKAE FUJIMOTO 3,613,269

RESPONSE RECORDING DEVICE

Filed Oct. 29, 1969 6 Sheets-Sheet 1

Oct. 19, 1971 SAKAE FUJIMOTO 3,613,269

RESPONSE RECORDING DEVICE

Filed Oct. 29, 1969 6 Sheets-Sheet 6

United States Patent Office 3,613,269

Patented Oct. 19, 1971

3,613,269

RESPONSE RECORDING DEVICE

Sakae Fujimoto, Tokyo, Japan, assignor to Kabushiki Kaisha Ricoh, Tokyo, Japan

Filed Oct. 29, 1969, Ser. No. 872,014
Claims priority, application Japan, Nov. 4, 1968, 43/80,271
Int. Cl. G09b *1/02*
U.S. Cl. 35—48 B 5 Claims

ABSTRACT OF THE DISCLOSURE

A response recording device wherein a card to be punched by depression of one of a plurality of push buttons is slidably movable in a holder. Depression of a push button will mark the card and upon return of the push button the card is advanced. However, a holding lever will prevent return of the push button if it is only partially depressed, and this will prevent advancement of the card.

BACKGROUND OF THE INVENTION

The present invention relates to generally a response recording device and more particularly to a response recording device for recording the responses of, to questionees or trainees in training of a large group.

It is difficult for a questioner to record all of the response of every questionee or trainee in a large group training when there are a plurality of responses to one question one of which the questionee or the trainee must select. Therefore, there has been proposed a device which records upon a recording card the responses of the trainees or questionees on the side of the questionee or trainee, but such device is not used in practice as it is not simple in construction and reliable in operation.

Accordingly one of the objects of the present invention is to provide a response recording device which is simple in construction and reliable in operation without any faulty operation or recording.

Another object of the present invention is to provide a response recording device of the type in which a plurality of push buttons are provided, the number of the push buttons corresponding to the number of responses to one question one of which a questionee or trainee must select each time, so that when the quetsionee or trainee selects one of the push buttons and depresses it, a recording card is marked or punched at a predetermined position thereof depending upon his response and thereafter is advanced by a predetermined distance for the next recording, thereby recording the responses of the trainee to all questions. When such a device is provided for each questionee or trainee, all of the responses of each of a large group under training can be easily recorded so that better results will be brought about for example in a training of a large group.

A further object of the present invention is to provide a response recording device of the type described above wherein the recording card may be advanced by the signals from a questioner or trainer independently of the operation of the questionee or trainee so that the questionee or trainee may record his response correctly upon the recording card at a predetermined position thereof even when the predetermined order of questions is changed by the questioner or trainee.

SUMMARY OF THE INVENTION

In a response recording device in accordance with the present invention, a recording card holder which is adapted to hold a recording card in position with a higher degree of accuracy is so arranged that the holder may be advanced by a predetermined distance in response to the depression of the selected push button. Each push button is provided with a punch or any other suitable marking means which punches a hole in the card or mark upon the card when the push button is depressed. In response to the movement of the push button to return to its initial or normal position, the card holder is advanced by a predetermined distance for the next operation or recording. The number of the push buttons is equal to that of the responses to one question. All of the cards upon the recording card holders of the response recording devices which are provided for all of the group under training for example, can be advanced simultaneously by a required distance by the signals for example from a questioner or trainer so that all of the responses may be correctly recorded upon the cards at predetermined positions thereof even when the predetermined order of the questions is changed by the questioner or trainer.

According to one aspect of the present invention, a form of safety device is provided in order to prevent the operation of the push buttons except one selected and depressed.

The above and other objects, features and advantages of the present invention will become more apparent from the following description of one illustrative embodiment thereof with reference to the accompanying drawings.

DESCRIPTION OF THE PREFERRED EMBODIMENT

Figures 1, 2:
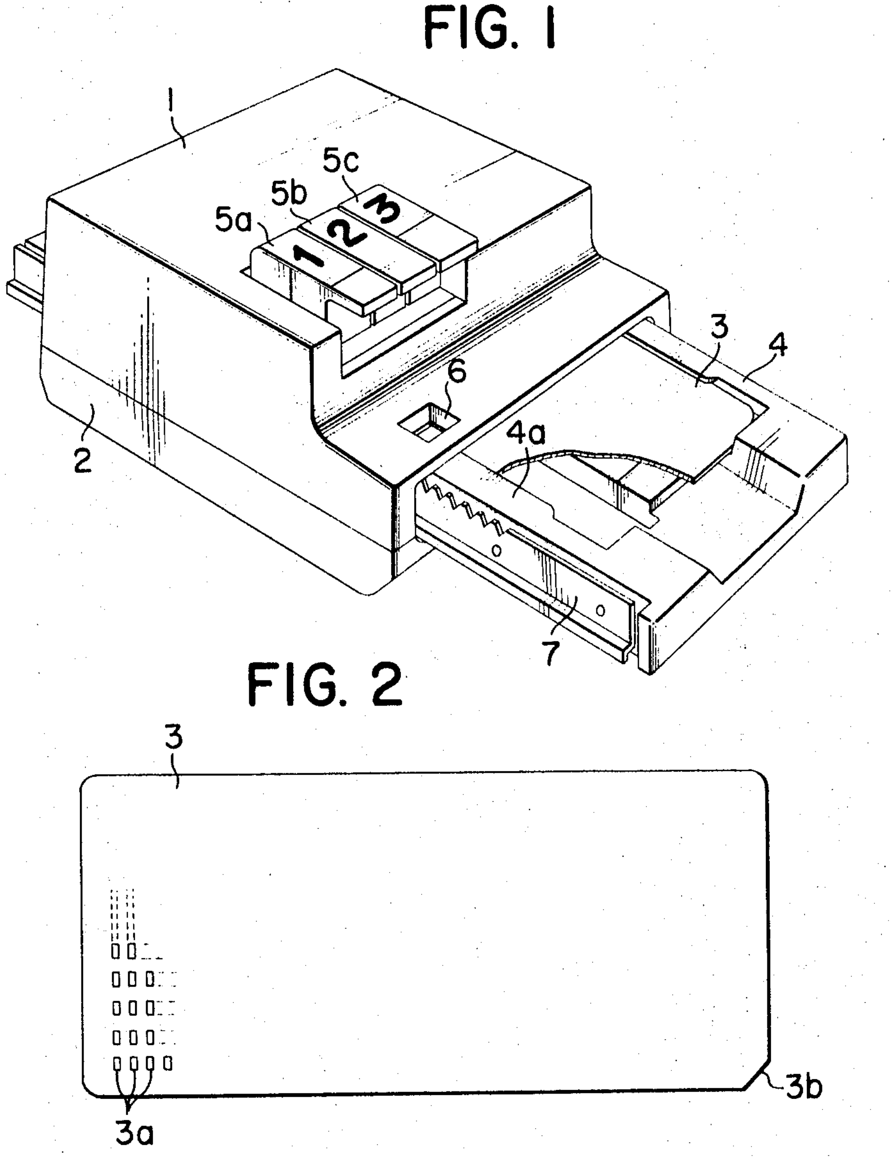
FIG. 1 is a perspective view of a response recording device of one embodiment of the present invention.
FIG. 2 is a plan view of a recording card used in the present invention.

Referring to FIG. 1, reference numeral 1 designates a cover of the response recording device in accordance with the present invention; 2, a bottom plate; 3, a recording card; and 4, a recording card holder. The upper top wall of the cover 1 has an opening through which extend three push buttons 5*a*, 5*b* and 5*c* and the lower top wall stepped down from the upper top wall of the cover 1 has a window 6 formed at the left side thereof for indicating the number of questions asked. As shown in FIG. 2, the rectangular recording card 3 has its one corner 36 cut off and a plurality of punch hole portions 3*a* arrayed in columns and rows. The peripheral side edges of each of the punch hole portions 3*a* are partly cut off so that when the portion 3*a* is punched, a punched hole may be readily formed as the narrow connecting strips remained uncut between the portion 3*a* and the card 3 are cut off by a punch or the like. The portions 3*a* in one row correspond with the contents of the response while the portions 3*a* in one column correspond with the order of the questions or the number thereof. For example in the instant embodiment, three push buttons 5*a*, 5*b* and 5*c* are provided so that the number of possible selections for response is within three. In order to increase the number of possible selections for response to one question, the number of push buttons may be increased accordingly.

The recording card 3 of the type described above is snugly placed upon the holder 4 and when one push button selected by a questionee depending upon his response to a question asked is depressed, one portion 3*a* in one selected column is punched by a mechanism to be described hereinafter. Thereafter, the recording card 3 is advanced by one row by a holder driving or advancing mechanism to be described hereinafter in more detail and connected drivingly with a rack member 7 disposed at one side surface of the holder 4. Thus the recording card 3 is ready to be punched for the next question. The number of questions asked, that is the number of rows of the recording card 3 advanced may be seen through the window 6 because the numbers are marked upon the upper surface of the left side frame 4*a* of the holder 4.

Figure 3:
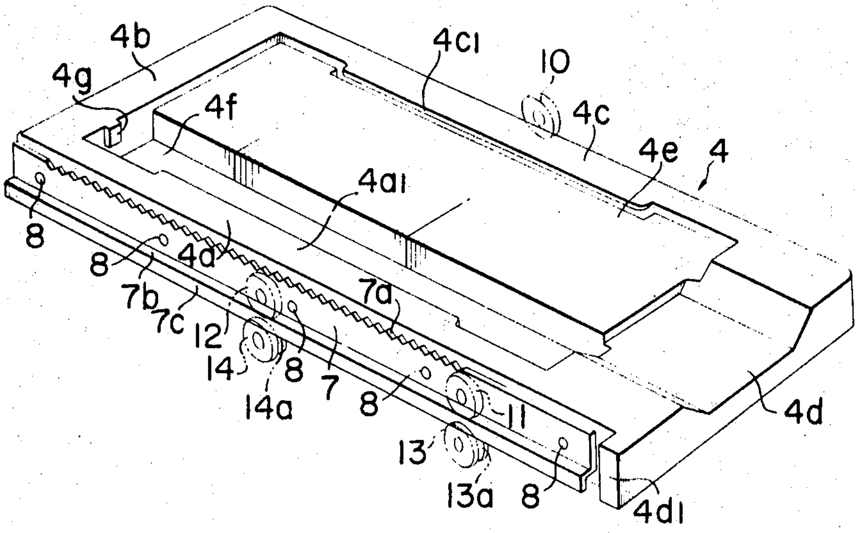
FIG. 3 is a perspective view illustrating only a card holder.

As shown in FIG. 3, the holder 4 comprises a flat surface 4*e* which is enclosed by the left side frame member 4*a*, a rear frame member 4*b*, a right frame member 4*c* and a front frame member 4*d*, with an elongated slot 4*f* being extended longitudinally between the flat surface 4*e* and the left frame member 4*a*. The right and left frame members 4*c* and 4*a* have projections $4c_1$ and $4a_1$ respectively extended inwardly from the inner side edges thereof so as to hold the recording card 3 in position. Therefore, it will be understood that the recording card 3 is inserted from the side of the front frame member 4*d* into the space defined by the flat surface 4*e* and the projections $4c_1$ and $4a_1$. A projection 4*g* for accurately positioning the recording card 3 is extended from the inner side surface of the rear frame member 4*b* so that the projection 4*g* coacts with the inner side wall surface of the front frame member 4*d* so as to precisely position the card 3 in the longitudinal direction thereof. As shown in FIG. 2 each of the punch hole portions 3*a* of the card 3 has a longitudinal width less than the lateral width. Therefore, the card 3 must be correctly positioned in the longitudinal direction in order to punch correctly a desired hole. The above described card positioning arrangement facilitates the correct positioning of the card 3. Without the provision of the projection 4*g*, the inner surface of the holder 4 must be machined with a high degree of accuracy thus resulting in various disadvantages. But when the projection 4*g* is provided in accordance with the present invention, the disadvantages may be eliminated because only the end surface of the projection 4*g* is required to be machined with a higher degree of accuracy.

Figures 4, 5:
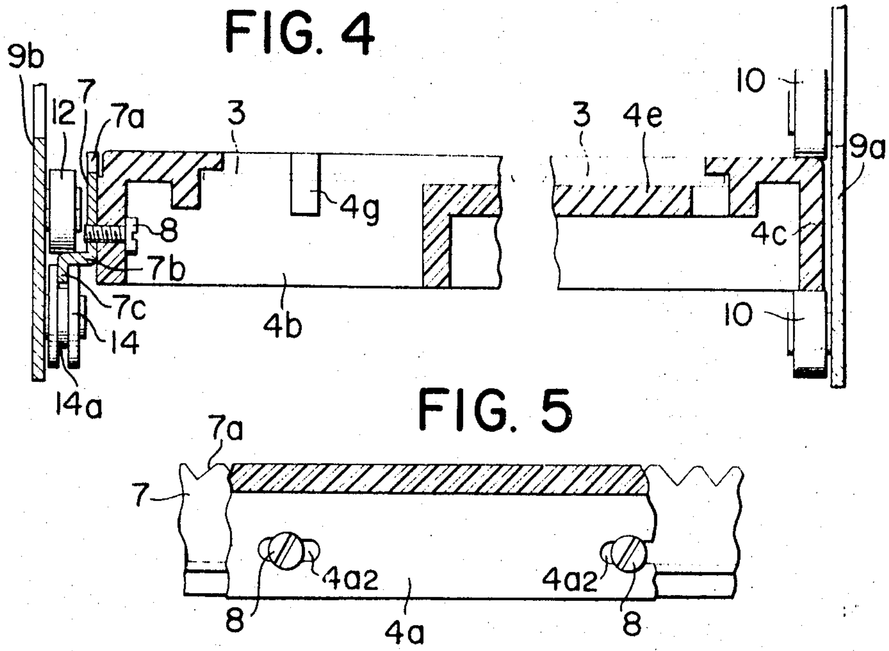
FIG. 4 is a fragmentary cross sectional view on large scale illustrating the mounting of the card holder.
FIG. 5 is a fragmentary side view illustrating the mounting of a rack of the card holder.

As shown in FIG. 5, the depending wall of the frame member 4*a* is provided with a plurality of elongated slots $4a_2$ so that the rack member 7 may be securely fixed upon the frame member 4*a* by screws 8 extended through the elongated slots $4a_2$ with the teeth 7*a* of the rack member 7 being directed upwardly. Because of the provision of the above elongated slots 7*a*, the position of the rack member 7 may be adjusted in the longitudinal direction relative to the projection 4*g*.

As shown in FIG. 4, the rack member 7 has its lower portion bent or curved outwardly so as to provide a flat portion 7*b* and a depending portion 7*c*. A pair of rollers 10 are loosely journalled to the right side wall 9*a* of the device so as to interpose therebetween the frame member 4*c* while rollers 11 and 12 are journalled to the left side wall 9*b* of the device and ride upon the flat portion 7*b* of the rack member 7. The left side wall 9*b* is further provided with grooved rollers 13 and 14 so that the depending portion 7*c* of the rack member 7 may be fitted into the grooves of the rollers 13 and 14 while the flat portion 7*b* is interposed between the upper and lower rollers 11, 12 and 13 and 14. Thus, it is seen that the holder 4 is supported by the pair of rollers 10 and the rollers 11, 12, 13 and 14 for slidable movement in the longitudinal direction with the flat surface 4 being maintained horizontally. Because of the provision of the rollers 11 and 12 and the grooved rollers 13 and 14 which supports slidably the curved portion of the rack member 7, the holder 4 may be moved while supporting the recording card with a high degree of accuracy all the time.

Figure 12:
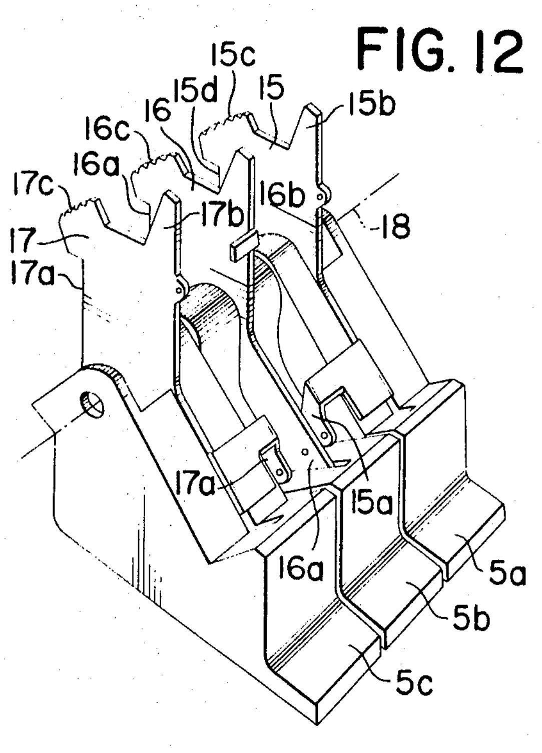
FIG. 12 is a perspective view of the push button assembly viewed from the bottom.
Figure 13:
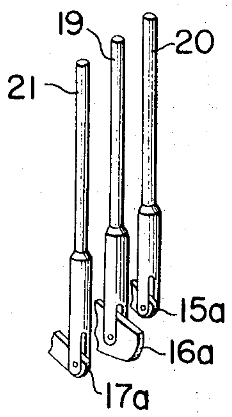
FIG. 13 is a perspective view illustrating punches attached to the push buttons.

Referring to FIG. 12, the undersurfaces of the push buttons 5*a*, 5*b* and 5*c* are connected to boot-shaped members 15, 16 and 17 respectively which are loosely fitted over a transverse shaft 18 extended between the right and left side walls 9*a* and 9*b*. The push buttons 5*a*, 5*b* and 5*c* are also loosely fitted over the shaft 18. A punch 19 is pivoted to the member 16 as at 16*a* while punches 20 and 21 are fixed to the members 15 and 17 at their inwardly bent portions 15*a* and 17*a* respectively (see FIG. 13).

Figure 6:
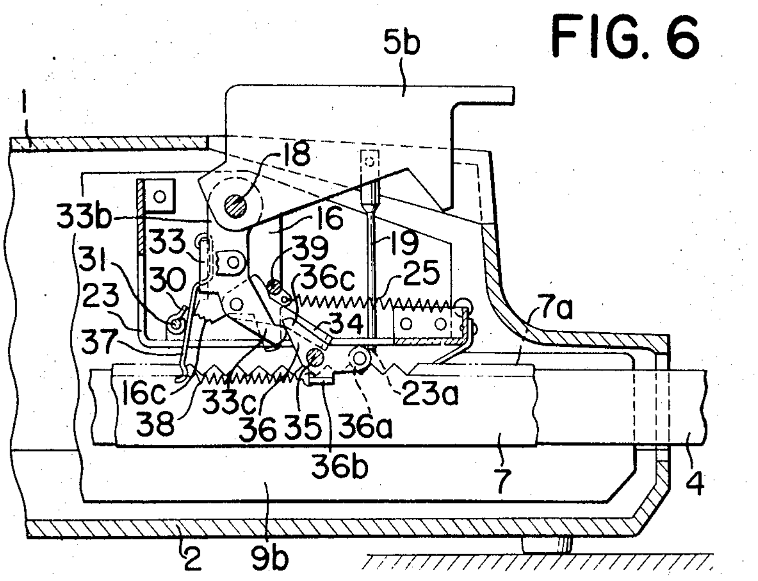
FIG. 6 is a side view illustrating a card holder driving or advancing mechanism.
Figures 14, 15:
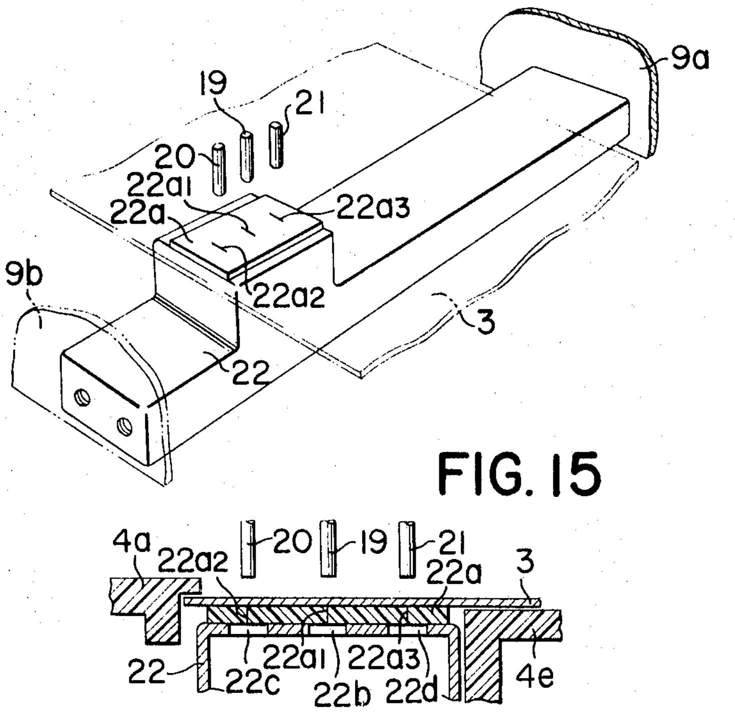
FIG. 14 is a perspective view of a receiving stand of a punching mechanism of the response recording device.
FIG. 15 is a fragmentary sectional view illustrating the essential parts of the punching mechanism.

Referring to FIG. 14, a receiving stand 22 having a rubber plate or sheet 22*a* fixedly secured upon the top surface thereof is interposed between the side walls 9*a* and 9*b* with the surface of the rubber plate 22*a* being coplanar with the flat surface 4*e* of the holder 4. Immediately above the holder 4 is disposed a shelf-like member 23 having a horizontally extending portion (see FIG. 6) and guide holes 23*a*, 23*b* and 23*c* (see FIG. 18) through which are fitted the punches 19, 20 and 21 respectively in order to maintain these punches vertically. As shown in FIG. 15, the rubber plate 22*a* is provided with openings $22a_1$, $22a_2$ and $22a_3$ for receiving the punches 19, 20 and 21 respectively while the receiving stand 22 is provided with openings 22*b*, 22*c* and 22*d* formed through the top wall or surface thereof for receiving the punches respectively.

Figure 11:
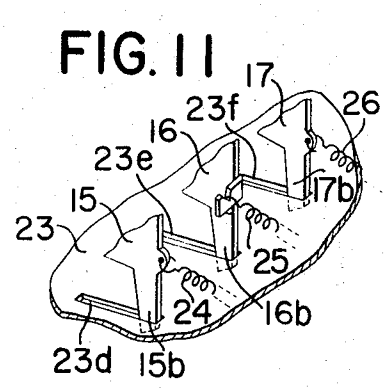
FIG. 11 is a perspective view illustrating low end portions of the push buttons.
Figure 16:
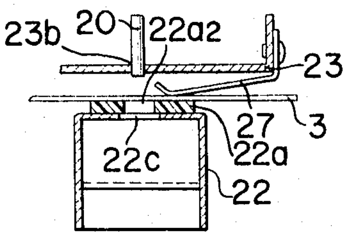
FIG. 16 a fragmentary sectional view illustrating means for holding the card in position when punched.
Figure 17:
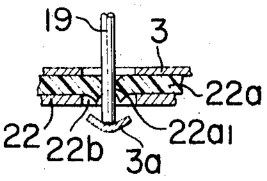
FIG. 17 is a fragmentary sectional view illustrating the card being punched.

Next the mode of punching holes in the recording card 3 will be described when for example the push button 5*b* is depressed. As shown in FIG. 17, upon depression of the push button 5*b*, its punch 19 moves downwardly and presses a portion 3*a* of the card 3 against the opening $22a_1$ of the rubber plate 22*a*. In the further downward movement of the punch 19 into the openings $22a_1$ and 22*b* of the rubber plate 22*a* and receiving stand 22, the inner wall of the opening $22a_1$ makes a close contact with the punch 19 so that the portion 3*a* of the card is completely punched off. In the similar manner as described above, the holes may be punched by the push button 5*a* and 5*c*. One ends of compression springs 24, 25 and 26 are fixed to the boot-like members 15, 16 and 17 as shown in FIG. 11 while the other ends are fixed to the leading edge of the shelf-like member 23 so that the boot-like members 15, 16 and 17 are normally biased so as to rotate in the counterclockwise direction together with the push buttons 5*a*, 5*b* and 5*c* about the transverse shaft 18 in FIG. 6. In this case it will be seen that the angle of rotation is limited when engaging members 15*b*, 16*b* and 17*b* of the members 15, 16 and 17 engage with the front and rear walls of the slots 23*d*, 23*e* and 23*f* formed in the longitudinal direction in the shelf-like member 23 (see FIG. 11). Thus, the push buttons 5*a*, 5*b* and 5*c*, the boot-like members 15, 16 and 17 and the punches 20, 19 and 21 are returned to their initial positions after punching. As shown in FIG. 16, a pressure plate 27 is attached to the leading edge of the shelf-like member 23 in order to prevent the recording card 3 from being lifted together with the punch and ensure that a hole may be punched through the card 3 at a predetermined position correctly.

Figure 18A:
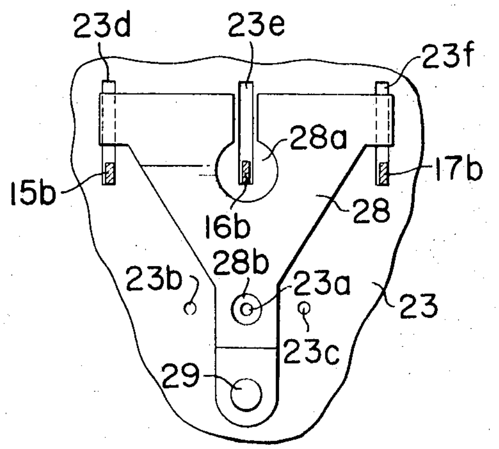
FIGS. 18–A, 18–B and 18–C are plan views of means for preventing a plurality of push buttons from being depressed simultaneously.
Figure 18B:
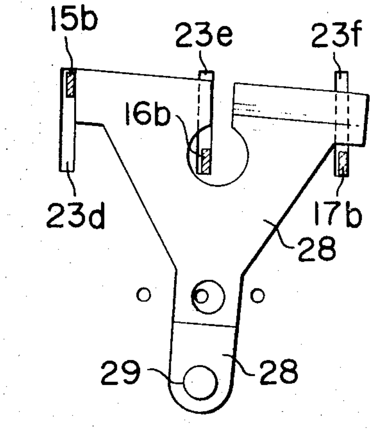
Figure 18C:
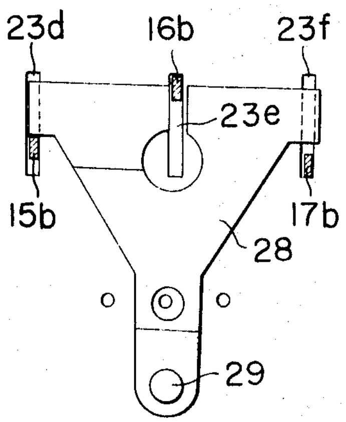

Referring to FIGS. 18–A, 18–B and 18–C, a Y-shaped control plate 28 is pivoted to the shelf-like member 23 by means of a pin 29 and the leading edge of the Y-shaped control plate 28 is positioned above the slots 23*d*, 23*e* and 23*f*. At the portion of the control plate 28 corresponding to the slot 23*e* is formed a slot having a width substantially equal to that of the slot 23*e* and being connected to a hole 28*a* which serves to prevent the engagement of the control plate 28 with the engaging member 16*b* when the member 16*b* is in its normal position. At the portion of the control plate 28 corresponding to the guide hole 23*a* formed through the shelf-like member 23 is formed a hole 28*b* so as to permit the free downward movement of the punch 19. When the push button 5*a* is depressed so that the boot-like member 15 is rotated in the clockwise direction against the spring (see FIG. 11), the engaging member 15*b* pushes the control plate 28 and moves upwardly as shown in FIG. 18–B. Therefore, the control plate 28 rotates in the clockwise direction about the pin 29 so that the passages of the engaging members 16*b* and 17*b* are interrupted. On the other hand, when the push button 5*b* is depressed, the engaging member 16*b* tends to return the control plate 28 to its normal or initial position as shown in FIG. 18–C and moves upwardly so that the passages for the engaging members 15*b* and 17*b* are interrupted or closed. Thus it will be seen that the simultaneous depression of the push buttons 5*a*, 5*b* and 5*c* may be positively prevented.

Figures 7, 8, 9:
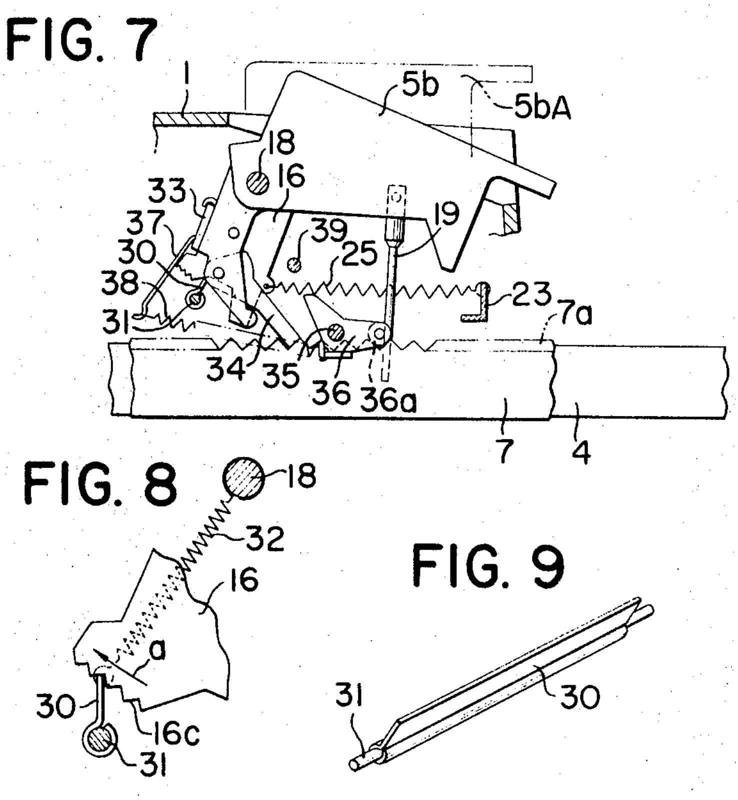
FIG. 7 is a view similar to FIG. 6 but a push button is depressed.
FIG. 8 is a side view of means for preventing the depressed push button from returning to initial or normal position.
FIG. 9 is a perspective view of an engaging member thereof.

At the leading ends of the bolt-like members 15, 16 and 17 are formed racks 15*c*, 16*c* and 17*c* inclined backwardly (see FIG. 12). At the left of the members 15, 16 and 17, the shelf-like member 23 is provided with an elongated plate-like engaging member 30 (see FIG. 9) carried by a shaft 31 which in turn is loosely journalled to the upright projections at the both side edges of shelf-like member 23. As shown in FIG. 8, the engaging member 30 is biased by a spring 32 whose one end is loosely fitted to the transverse shaft 18 so that the leading edge may be moved into the paths of the racks 15*c*, 16*c* and 17*c* of the members 15, 16 and 17. When for example the push button 5*b* is depressed, the member 16 is caused to rotate in the clockwise direction about the shaft 18 in FIG. 6 so that the rack 16*c* is in engagement with the leading edge of the engaging member 30 as shown in FIG. 8. When the engaging member 30 is rotated in the clockwise direction (indicated by the arrow *a* in FIG. 8) because of the engagement with the rack 16*c*, the engaging member 30 is pushed toward the left by the rack 16*c* so that the rack 16*c* is prevented from moving in the direction opposite to the direction indicated by the arrow *a*. When the push button 5*b* is completely depressed as shown in FIG. 7 so that the rack 16*c* passes beyond the engaging member 30 to the left, the engaging member 30 is so positioned that the rack 16*c* may be easily returned to its normal or initial position. The same is true when the button 5*a* or 5*c* is depressed except that either the rack 15*c* or 17*c* is actuated. It is seen therefore that the push buttons 5*a*, 5*b* and 5*c* cannot return to their initial positions unless they are completely depressed to the full stroke. Therefore, the recording card 3 will not be advanced without being punched.

Figure 10:
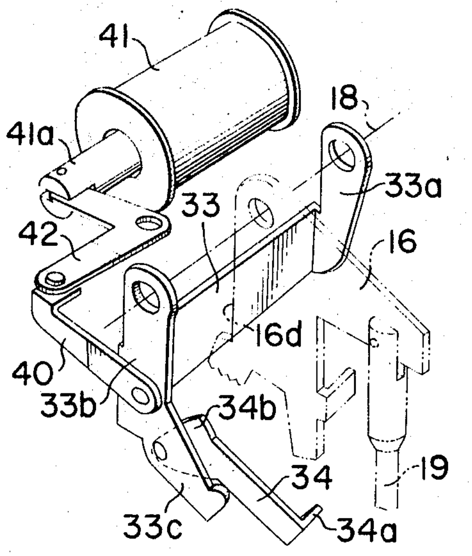
FIG. 10 is a perspective view illustrating a mechanism for drivingly coupling a rocking member which is actuated by a push button to an electromagnet.

As show in FIG. 10, a rocking plate 33 which is loosely fitted over the transverse shaft 18 at the bent portions 33*a* and 33*b* thereof is adapted to engage with the shin portions 15*d*, 16*d* and 17*d* (see FIG. 12) of the members 15, 16 and 17. The lower end of the bent portion 33*b* is extended downwardly to the right so as to form an engaging element 33*c*. A feed arm 34 has its base loosely pivoted to the lower end portion of the bent portion 33*b*. A pressure member 36 having a roller 36*a* riding upon the rack 7*a*, pivoted to one end thereof for positioning the holder is pivotably fixed to a pin 35 extended from the side wall 9*b* in FIG. 6. A spring 38 is loaded between the depending arm 36*b* of the pressure member 36 and the lower end of a hook 37 fixed to the rocking plate 33 so that the engaging element 33*c* of the rocking plate 33 is normally pressed against the arm 36*c* of the pressure member 36 while the roller 36*a* of the pressure member 36 is normally engaged with the rack 7*a*, thereby stopping the rack 7*a* like a click stop. The arm 34 has a tendency of normally having its bent end 34*a* pressed against the rack 7*a* (see FIG. 10) by a spring (not shown) and the raised edge 34*b* (see FIG. 10) is formed at the upper portion of the base of the feed arm 34. Therefore, when no push buttons 5*a*, 5*b* and 5*c* are depressed, the raised edge 34*b* normally engages with a pin 39 fixed to the side wall 9*b* so that the bent end 34*a* may be released from the rack 7*a* (see FIG. 6). If the feed arm 34 is always pressed against the rack 7*a*, the holder 4 cannot be moved to the left in FIG. 6 manually, but when arranged as described hereinabove, the holder 4 may be freely moved manually in both directions.

The mode of operation of the holder advancing mechanism will be described. When for example the push button 5*b* is depressed, the boot-like member 16 made integral with the push button 5*b* rotates in the clockwise direction about the transverse shaft 18 as shown in FIG. 7 so that the rocking plate 33 is caused to move in the same direction. Therefore, the feed arm 34 is caused to move toward the left in response to the movement of the rocking plate 33. When the push button 5*b* is returned to the position 5*ba* designated by the chain lines in FIG. 7, the bent end 34*a* of the feed arm 34 engages with the rack 7*a* so that the rack 7*a* is moved toward the right in the figure by the rocking plate 33 which is returning its normal or initial position by the spring 38. The displacement of the rack 7*a* when the push button is depressed once is such that the recording card 3 is advanced by one row of the punched hole portions 3*a*.

Referring to FIG. 10 again, one end of a connecting arm or lever 40 is loosely journalled to the bent portion 33*b* of the rocking arm 33 and an electromagnet 41 is fixed to a stationary member on the left side of the rocking plate 33. The other end of the connecting lever 40 is pivoted to one end of bell crank 42 whose other end is loosely pivoted to a plunger 41*a* of the electromagnet 41. The electromagnet 41 is operatively coupled to an instruction device disposed at the exterior of the response evaluation and recording device so as to rock the rocking plate 33. Thus it is seen that the device of the present invention may advance the holder 4 by the electromagnet 41 which is energized when the signals from the exterior are applied thereto and that a plurality of devices of the present invention may be operatively coupled to the common instruction device so that all of them may advance their respective holders simultaneously. It is understood that the electromagnet 41 may be coupled operatively to any suitable rocking member other than the above described rocking plate 33. The displacement of the holder 4 in the longitudinal direction is limited when the inner surfaces of the frame members 4*d* and 4*g* abut against the receiving stand 22 (see FIG. 14). According to the present invention the left side of the frame member 4*d* is slightly extended outwardly toward the left as best shown in FIG. 3 so as to provide an engaging edge 4$d_1$ which is so positioned as to engage with the rollers 11 and 13, thereby determining the starting position of the holder 4. It is preferable to use as the recording card 3 the cards available in the market and used in data processing systems. A marking card may be used in the device of the present invention when the suitable printing members are attached to punches 19, 20 and 21. The cut-off portion 3*b* of the recording card 3 is provided as an index mark when the other half side portion of the card 3 is punched by reversing the card 3 after one half side portion (the lower half side portion in FIG. 3) of the card 3 has been punched. The device in accordance with the present invention is further so arranged that switches may be actuated by the leading ends of the boot-like members so as to turn on response indicating lamps. Furthermore, the device of the present invention may be operatively coupled to other devices.

According to the present invention, the responses from many questionees may be recorded correctly upon the cards in the order of the questions asked so that a great advantage may be brought about for example in the field of the training of a large group. Furthermore, the cards are advanced by the signals from the control unit exterior of the devices so that the correct response recordings upon the cards may be ensured.

What is claimed is:

1. A response recording device comprising
a response record card adapted to be punched to indicate responses;
a holder for holding said card;
support means mounted in said holder and adapted to receive said card therein;
a push button structure comprising a plurality of push buttons mounted on said device, each push button having an individual punch attached thereto, means permitting one of said push buttons to be individually depressed for a predetermined distance to cause said punch to mark said card;
means for providing slidably advancing movement to said holder within said device, said means comprising a longitudinal rack formed integral with said holder;
a shaft mounted in said device for supporting said push buttons and provide for rotation of said buttons about said shaft when one of said buttons is depressed;
a rocking plate formed integral with said pushbutton structure and adapted to be rotated in a predetermined direction about said shaft when one of said push buttons is depressed;
a feed arm loosely pivoted on said rocking plate and adapted to engage said rack when said rocking plate is rotated in said predetermined direction for advancing said holder; and
holding means mounted on said device, said holding means being biased to hold said rocking plate in its rotated position when said pushbutton is depressed less than said predetermined distance thereby precluding marking of said record card.

2. A response recording device according to claim 1 in which said push button structure includes a rack portion, said holding means comprises an elongated member adapted to engage said rack portion when said push button is depressed less than said predetermined distance, and said rack portion has a predetermined size such that engagement with said elongated member is prevented when said pushbutton is depressed said predetermined distance.

3. A response recording device according to claim 2 in which said feed arm is engaged with said holder rack when said push button is depressed said predetermined distance, a hook element is attached to said push button structure and biased to return said push button structure in a direction opposite to said predetermined direction to non-depressed condition thereby causing said feed arm to advance said holder rack.

4. A response recording device according to claim 1 in which a pivotable lever is positionable to engage said holder rack to prevent the advancing movement, said pivotable lever held in said engaged position by abutment by a portion of said rocking plate when said push button is in non-depressed condition.

5. A response recording device according to claim 4 in which the rotative movement of said rocking plate releases said engagement of said holder rack and said lever.

References Cited

UNITED STATES PATENTS

| | | | |
|---|---|---|---|
| 2,102,577 | 12/1937 | Cleven | 35—48 X |
| 2,564,089 | 8/1951 | Williams et al. | 35—9 |
| 3,214,847 | 11/1965 | Dorsett et al. | 35—9 |
| 3,250,166 | 5/1966 | Stewart | 83—633 X |
| 3,459,084 | 8/1969 | Schlafly | 35—48 X |

ROBERT W. MICHELL, Primary Examiner

J. H. WOLFF, Assistant Examiner